(12) United States Patent
Araki et al.

(10) Patent No.: US 10,298,548 B2
(45) Date of Patent: May 21, 2019

(54) EFFICIENT DATA REPLICATION OF AN ENCRYPTED FILE SYSTEM

(71) Applicant: International Business Machines Corporation, Armonk, NY (US)

(72) Inventors: Hiroshi Araki, Yokohama (JP); Shah M. R. Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/951,242

(22) Filed: Nov. 24, 2015

(65) Prior Publication Data
US 2017/0149742 A1 May 25, 2017

(51) Int. Cl.
*G06F 21/80* (2013.01)
*H04L 29/06* (2006.01)
*H04L 29/08* (2006.01)
*G06F 3/06* (2006.01)
*G06F 21/78* (2013.01)
*G11B 5/012* (2006.01)

(52) U.S. Cl.
CPC ............ *H04L 63/0428* (2013.01); *G06F 3/06* (2013.01); *G06F 21/78* (2013.01); *H04L 67/06* (2013.01)

(58) Field of Classification Search
None
See application file for complete search history.

(56) References Cited

U.S. PATENT DOCUMENTS

| | | | | | |
|---|---|---|---|---|---|
| 6,460,095 | B1 * | 10/2002 | Ueno | ........................ | G06F 5/06 710/12 |
| 7,716,389 | B1 * | 5/2010 | Bruce | ...................... | G06F 13/28 370/338 |
| 2008/0052537 | A1 * | 2/2008 | Nishizono | ............... | G06F 21/78 713/193 |
| 2009/0327758 | A1 * | 12/2009 | Sakanaka | .............. | G06F 3/0623 713/193 |

(Continued)

FOREIGN PATENT DOCUMENTS

| | | |
|---|---|---|
| CN | 103268456 | 8/2013 |
| WO | 2008065343 A1 | 6/2008 |

OTHER PUBLICATIONS

Sandip Agarwala et al.; "e-Safe: An Extensible, Secure and Fault Tolerant Storage System"; 2007 First International Conference on Self-Adaptive and Self-Organizing Systems, pp. 239-248; IEEE Computer Society; 2007.

(Continued)

*Primary Examiner* — Venkat Perungavoor
(74) *Attorney, Agent, or Firm* — Kunzler, PC

(57) ABSTRACT

An apparatus for data replication is disclosed. A method and computer program product also perform the functions of the apparatus. In one embodiment, an apparatus includes a read module configured to read into a communication buffer, from a persistent storage volume, a first file that is encrypted with file-level encryption without decrypting the first file. In certain embodiment, the apparatus also includes a write module configured to write data from a second file from the communication buffer, that is received from a source device and that is encrypted with file-level encryption, to the persistent storage volume without decrypting the second file.

14 Claims, 6 Drawing Sheets

(56) References Cited

U.S. PATENT DOCUMENTS

| | | | | |
|---|---|---|---|---|
| 2010/0332844 A1* | 12/2010 | Kobayashi | ............ | G06F 21/80 |
| | | | | 713/189 |
| 2012/0137139 A1* | 5/2012 | Kudoh | ................. | H04L 9/10 |
| | | | | 713/189 |
| 2013/0073821 A1* | 3/2013 | Flynn | ................. | G06F 3/061 |
| | | | | 711/162 |
| 2014/0006685 A1* | 1/2014 | Peterson | ............ | G06F 12/0238 |
| | | | | 711/102 |
| 2014/0304525 A1* | 10/2014 | Novak | ............. | H04L 63/061 |
| | | | | 713/193 |
| 2015/0026509 A1* | 1/2015 | Zhang | ............. | G06F 13/4059 |
| | | | | 714/6.11 |

OTHER PUBLICATIONS

Software Patent Institute et al.; "How to Make Replicated Data Secure"; An IP.com Prior Art Database Technical Disclosure; http://ip.coni/IPCOM/000148162; Mar. 29, 2007.

\* cited by examiner

US 10,298,548 B2

EFFICIENT DATA REPLICATION OF AN ENCRYPTED FILE SYSTEM

FIELD

The subject matter disclosed herein relates to data replication and more particularly relates to efficient data replication of an encrypted file system.

BACKGROUND

Replication is widely used in storage systems to backup data stored at a production site to another remote site for disaster recovery. In many cases, the Internet is used for the connection between the production site and the disaster recovery site. Many different protocols, including TCP/IP, may used to transfer the data. Also, in many cases, the data may be encrypted in transit to protect the data.

In storage systems, the data in a block storage device (e.g., HDD) may also be encrypted for security reasons. For a write request, the storage system encrypts data from the device requesting the write (i.e., the host) before writing the data to the block storage device. Similarly, for a read request, the storage system decrypts the data before presenting the data to the requesting device. The encryption/decryption process is transparent to the requesting device because this encryption/decryption is processed in the file system layer. However, the encryption/decryption process of the data in the block storage device, and the encryption/decryption process of the data in transit are not integrated processes, and are therefore duplicative processes that are wasteful of computing resources.

BRIEF SUMMARY

An apparatus for data replication is disclosed. A method and computer program product also perform the functions of the apparatus. In one embodiment, an apparatus includes a read module configured to read into a communication buffer, from a persistent storage volume, a first file that is encrypted with file-level encryption without decrypting the first file. In certain embodiment, the apparatus also includes a write module configured to write data from a second file from the communication buffer, that is received from a source device and that is encrypted with file-level encryption, to the persistent storage volume without decrypting the second file.

In certain embodiments, at least a portion of the read module and/or the write module includes one or more of hardware and program instructions. The program instructions may be stored on one or more computer readable storage media.

In other embodiments, the apparatus includes a first communication module configured to communicate with, via an insecure network, a second communication module of at least one of the source device or a target device. The first communication module may be configured to establish a first communication path to transmit the first file to the target device and a second communication path to receive the second file from the source device. In one embodiment, the communication module is configured to encrypt at least one of the first communication path or the second communication path. The encrypted communication path may be a Secure Shell (SSH) tunnel.

In other embodiments, the read module comprises an application programming interface through which a program component requests the first file be retrieved from the persistent storage volume. Additionally, the write module comprises an application programming interface through which the program component requests that the second file be written to the persistent storage volume.

A method for data replication, in one embodiment, includes reading into a communication buffer, from a persistent storage volume, a first file that is encrypted with file-level encryption without decrypting the first file, writing a second file from the communication buffer, that is received from a source device and that is encrypted with file-level encryption, to the persistent storage volume without decrypting the second file, and communicating at least one of the first file or the second file, via an insecure network, with at least one of a target device or the source device.

The method may also include establishing a first communication path to transmit the first file to the target device and a second communication path to receive the second file from the source device, and encrypting at least one of the first communication path or the second communication path. In one embodiment, at least one of the encrypted first communication path or the encrypted second communication path comprises a Secure Shell ("SSH") tunnel.

In one embodiment, the method also includes requesting, via an application programming interface, that the first file be retrieved from the persistent storage volume, and requesting, via an application programming interface, that the second file be written to the persistent storage volume.

In one embodiment, a computer program product for data replication includes a computer readable storage device having program instructions embodied therewith. The program instructions, in some embodiments, are executable by a processor to execute the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
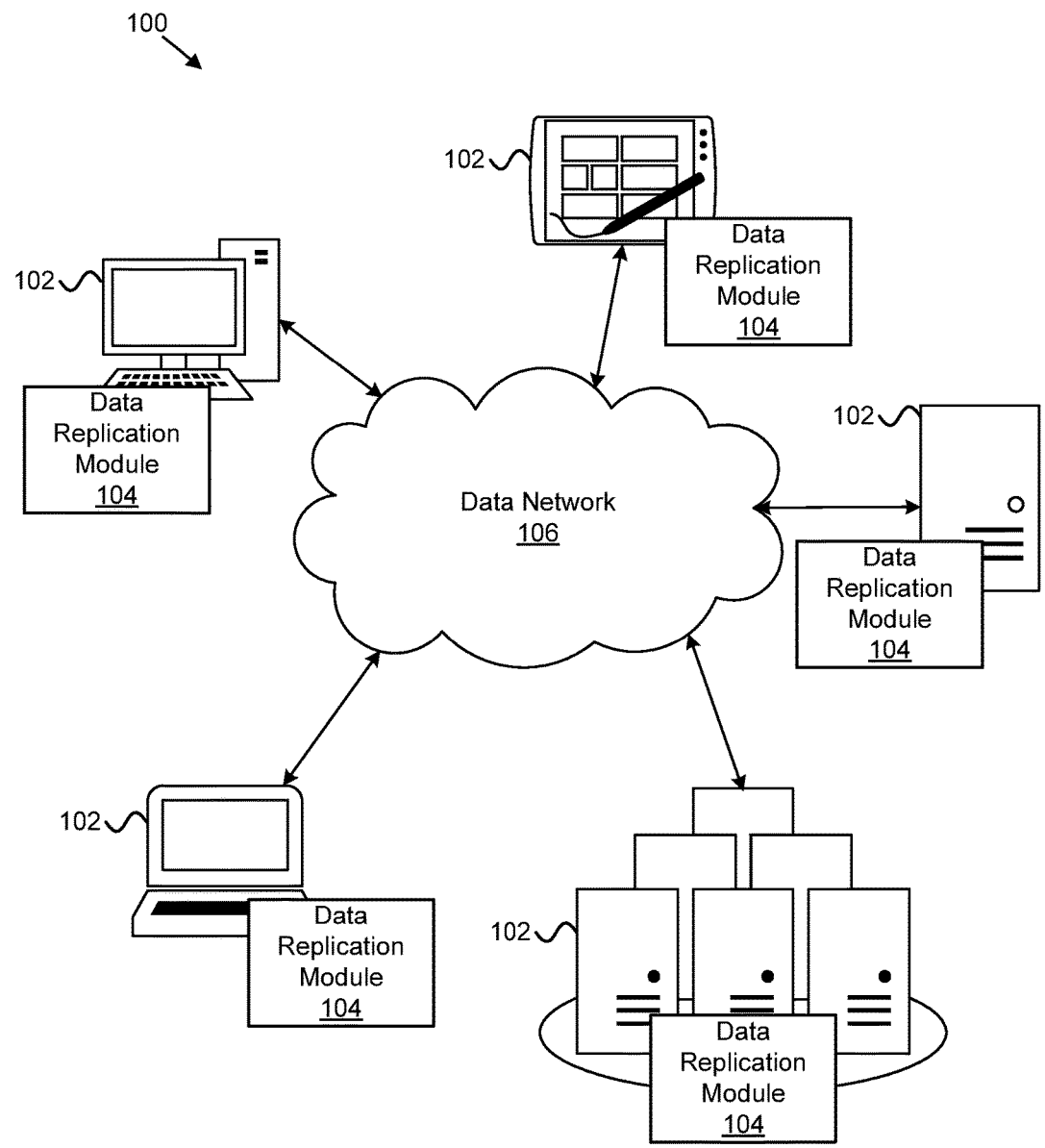
FIG. 1 depicts one embodiment of a system for data replication.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures Like numbers refer to like elements in all figures, including alternate embodiments of like elements.

FIG. 1 depicts one embodiment of a system 100 for data replication. In one embodiment, the system 100 includes information handling devices 102, data replication modules 104, and data networks 106. Even though a particular number of information handling devices 102, data replication modules 104, and data networks 106 are depicted in the system 100 of FIG. 1, one of skill in the art will recognize that any number or configuration of information handling devices 102, data replication modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as encryption key servers, web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

The data replication module 104 is configured to backup data from a source information handling device 102 to a target information handling device 102. Data replication modules 104 of the source and target devices may communicate to handle the transfer of data from the source information handling device 102 to the target information handling device 102. Data may be stored on storage devices may be encrypted with file-level encryption for security reasons. Traditional data replication modules transparently decrypt the file-level encryption before handing the data of the file to a communication module for transfer to the target information handling device. The data is then subsequently encrypted again before transmitting the data over the data network 106, which is insecure. As will be discussed in greater detail below, the data replication module 104 is configured to detect when a read request is for the purpose of data replication to a target device, and is further configured to not decrypt the file-level encryption in response to the detection of a data replication request.

As may be appreciated, the data replication module 104 may be used in any suitable data replication system 100. In certain embodiments, as described below with reference to FIGS. 2 and 3, the data replication module 104 includes multiple modules that perform the operations of the data replication module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
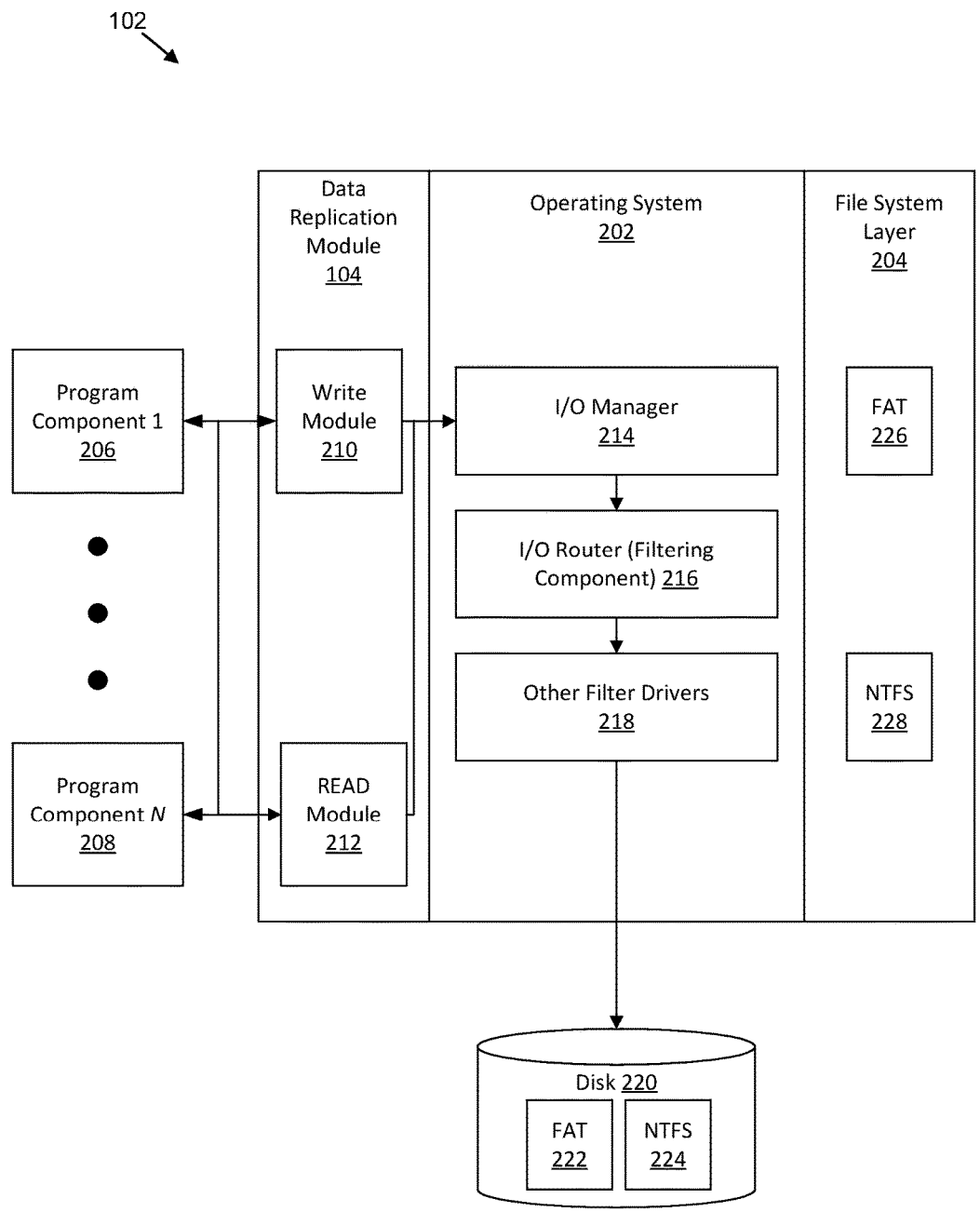
FIG. 2 is a schematic block diagram illustrating one embodiment of the information handling device in accordance with embodiments of the present disclosure.

FIG. 2 is a schematic block diagram illustrating one embodiment of the information handling device 102 in accordance with embodiments of the present disclosure. The information handling device (hereinafter "device") 102, comprises an operating system 202 that includes a file system layer 204, and the data replication module 104. In certain embodiments, the data replication 104 module is implemented as an application programming interface ("API") layer. The device 102 also includes a number of software programs or program components, such as application programs. These are shown in FIG. 2 as program components 206 and 208. They are also referenced as components 1 and N, where N is any reasonable number greater than 1. As used herein, the term "program component" refers to any software program or portion thereof, including, without limitation, application programs, application services such as operating system service programs, software programs in the form of script language code, compiled code and interpreted code, code implemented by hardware such as by a hardware component, and also any process or instance of any of the above.

Also depicted, as part of the data replication module 104, are a write module 210 and a read module 212. The write module 210 and the read module 212 may also be implemented as application programming interfaces. The operating system 202, in one embodiment, includes an I/O manager 214 and an I/O router layer 216 that is provided with buffering capability. The I/O router 216 is configured to function as a filtering component for write requests. The operating system 202 may also include other filter drivers 218 which collectively refers to other filter drivers included in the operating system 202, if any.

The device 102 also includes a storage disk 220, such as a hard disk drive or other hardware for persistent data storage. Data is stored in storage disk 220 in close association with the file system layer 204. The storage disk 220 may be partitioned according to any number of different formatting standards, including but not limited to File Allocation Table ("FAT") 222 and New Technology File System ("NTFS") 224. The file system layer 204 may include corresponding components 226, 228.

Figure 3:
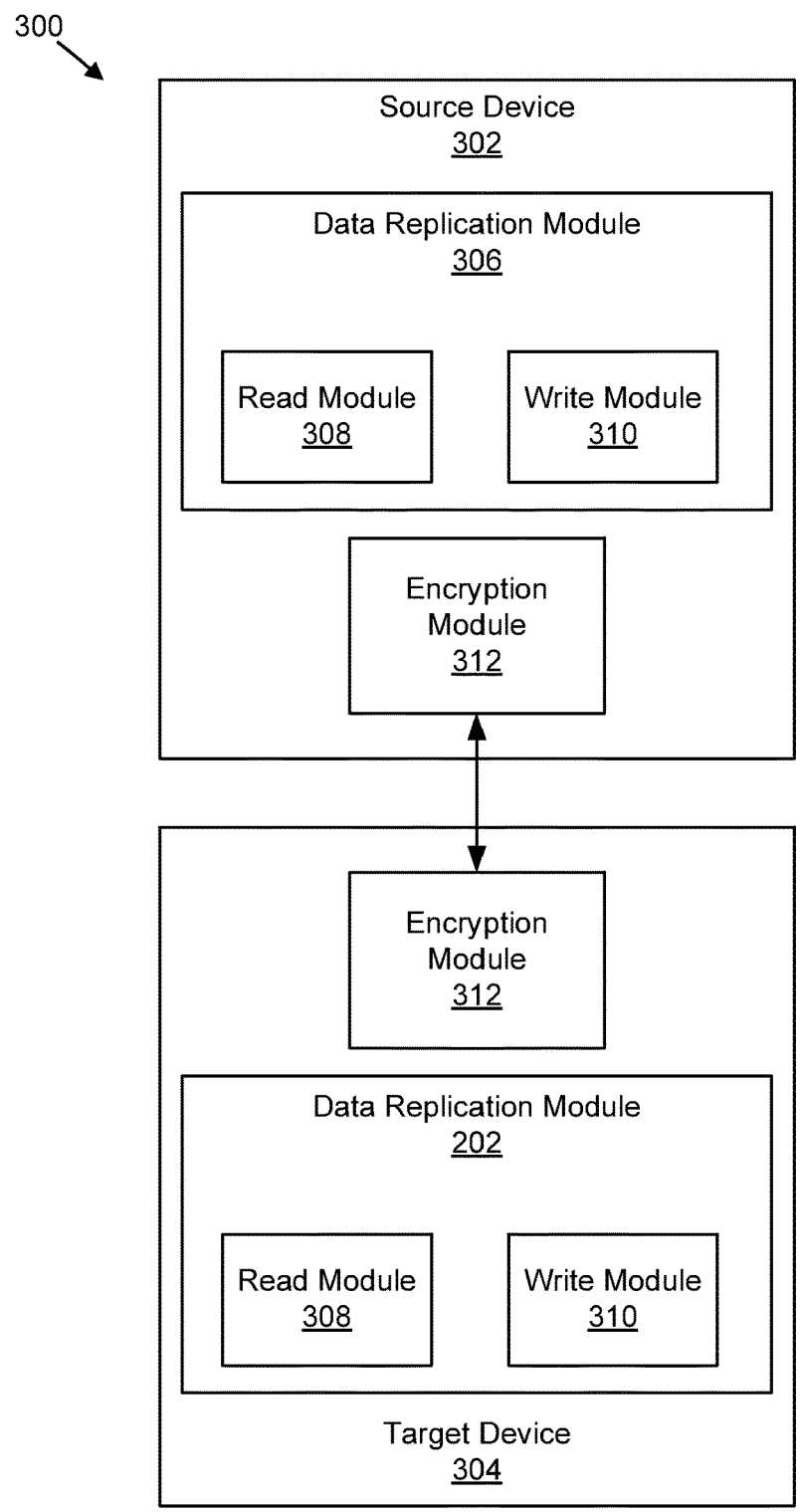
FIG. 3 is a schematic block diagram illustrating one embodiment of a data replication system in accordance with embodiments of the present disclosure.

FIG. 3 is a schematic block diagram illustrating one embodiment of a data replication system 300 in accordance with embodiments of the present disclosure. The data replication system 300, in the depicted embodiment, illustrates a source device 302 and a target device 304. The source device 302 and the target device 304 are equivalent to the above described information handling devices 102 of FIGS. 1 and 2. In certain embodiments, the source device 302 is configured to receive a command or instruction to replicate a file to the target device 304. Certain components described above in FIG. 2, such as the storage device, have been omitted from FIG. 3 for clarity.

The source data replication module 306, is configured to receive an instruction to replicate a file and/or detect that a read request is a part of a request to replicate the file to the target device 304. The data replication module 306, in certain embodiments, may be configured to detect that the file is encrypted with file-level encryption. In some embodiments, the read module 308 is embodied as an application programming interface. One example of an application programming interface suitable for use as the read module 308 in accordance with embodiments of the present disclosure is:

raw_read (F, buffer, N, offset)

This example is configured to instruct the read module 308 to read encrypted data without decrypting the file-level encryption. In particular, the example instructs the read module 308 to read a maximum size N of encrypted file F from an offset into a buffer and return. Similarly, the write module 310 may be embodied as an application programming interface. One example of an application programming interface suitable for use as the write module 310 in accordance with embodiments of the present disclosure is:

raw_write (F, buffer, N, offset)

This example is configured to instruct the write module 310 to write a buffer received from another device (i.e., receiving a buffer from another source device) without encrypting the already file-level encrypted file. In particular, the example instructs the write module 310 to write a maximum size N of the buffer into file F from an offset.

Each device 302, 304 may include an encryption module 312 that is configured for encrypting the buffer prior to transmitting the encrypted buffer to a specific target device 304. Accordingly, data replication across an insecure network, such as the Internet, may be secured. Beneficially, the data in transit may be doubly encrypted, the original file-level encryption that was not decrypted by the read module 308, and the encryption applied by the encryption module 312. As such, if the encryption of the encryption module 312 is compromised, the data in transit is still protected by the file-level encryption.

In one embodiment, the encryption module 312 of each of the source device 302 and the target device 304 are configured to establish a Secure Shell ("SSH") tunnel. An SSH tunnel consists of an encrypted tunnel created through an SSH protocol connection. The SSH tunnel functions to encrypt any data that flows through the SSH tunnel. In an alternative embodiment, the encryption module 312 uses any of the known encryption methods to encrypt the buffer, including but not limited to, secure Virtual Private Networks ("VPN"), etc.

Figure 4:
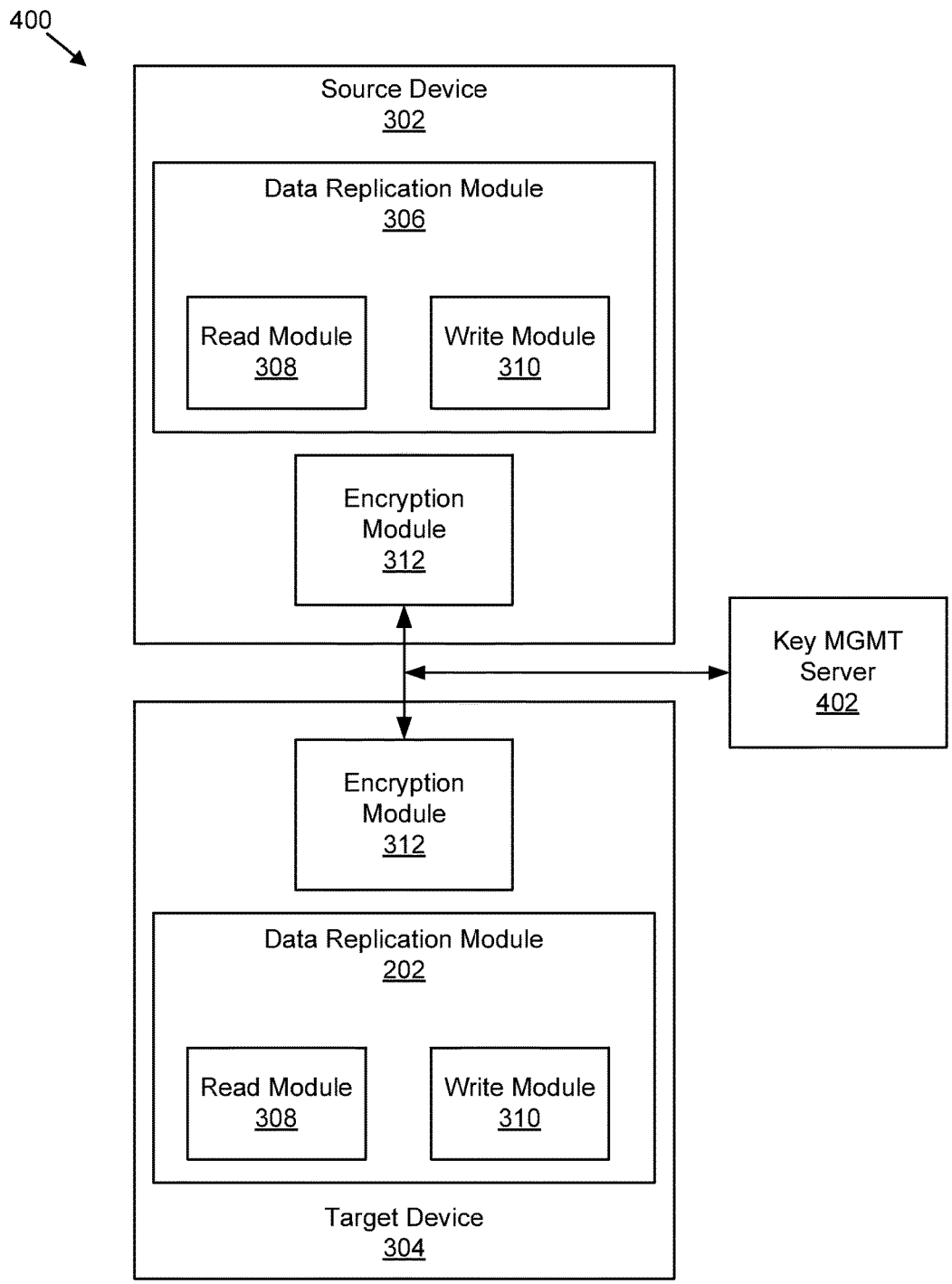
FIG. 4 is a schematic block diagram illustrating another embodiment of a data replication system in accordance with embodiments of the present disclosure.

FIG. 4 is a schematic block diagram illustrating another embodiment of a data replication system 400 in accordance with embodiments of the present disclosure. In the depicted embodiments the source device 302 and the target device 304 are configured to separately communicate with a key management server 402. The key management server 402 may serve as an offsite repository for storing encryption keys that are useful to decrypt file-level encryption of files that have been replicated from the source device 302 to the target device 304. Alternatively, the encryption keys may be stored on the same storage device as the replicated files.

Figure 5:
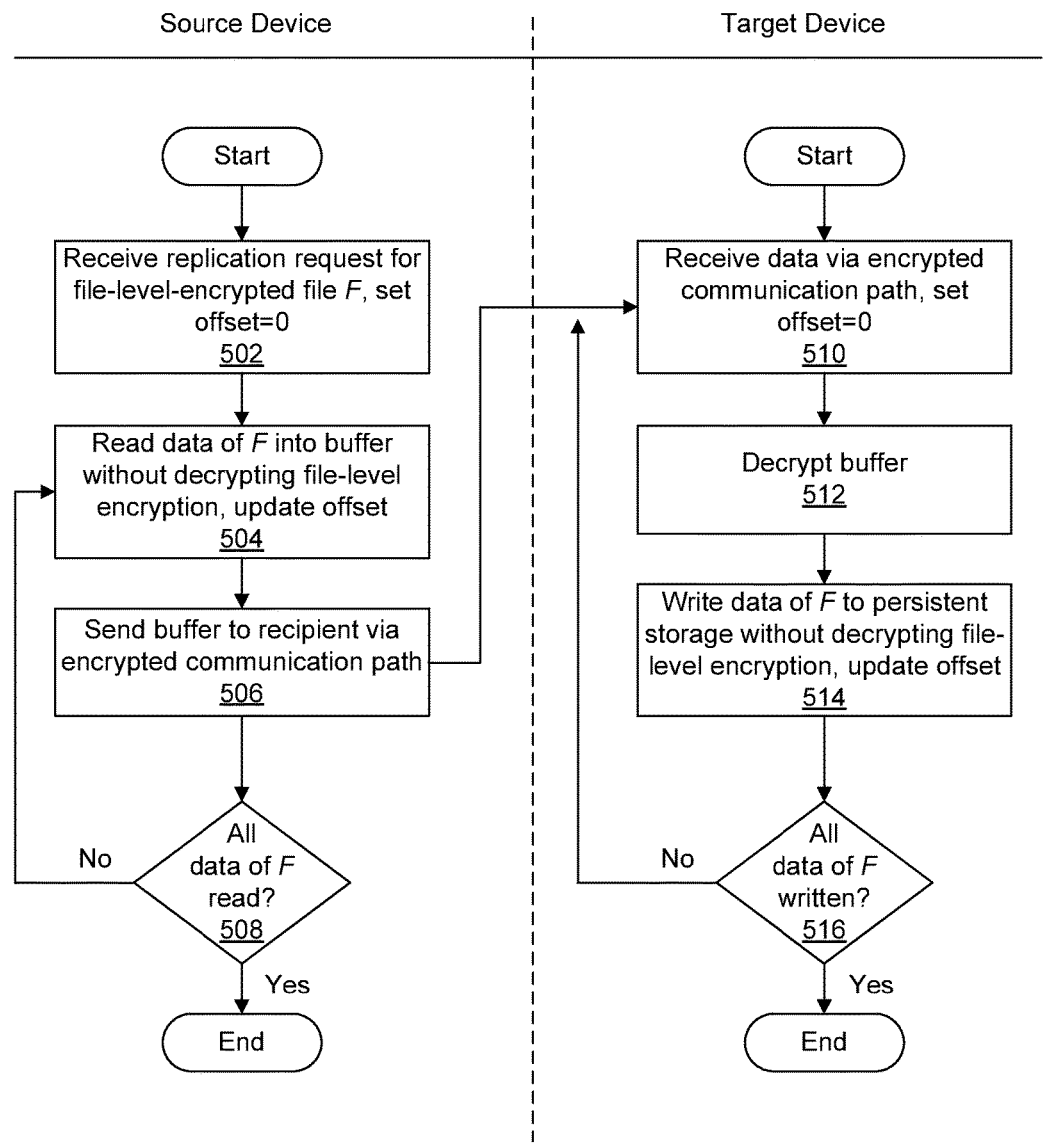
FIG. 5 is a flow diagram of one embodiment of a method for data replication across insecure networks in accordance with embodiments of the present disclosure.

FIG. 5 is a flow diagram of one embodiment of a method 500 for data replication across insecure networks in accordance with embodiments of the present disclosure. The method is performed by processing logic that may comprise hardware (circuitry, dedicated logic, etc.), software (such as is run on a general purpose computer system or a dedicated machine), or a combination of both. In one embodiment, the method is performed by a data replication module (e.g., data replication module 104 of FIG. 1).

The method 500 starts and the processing logic, at block 502 receives a replication request for file-level encrypted file F. In one embodiment, the processing logic receives a request for data replication by receiving instructions, via an application programming interface, to replicate file F. The instruction may specifically call, for example, raw_read as described above. In an alternative embodiment, the processing logic may determine that a read request is part of a data replication operation instead of a normal read operation by analyzing the read request.

The processing logic then, at block 504, reads data of the file-level encrypted file F into a buffer from a storage device without decrypting the file-level encryption. The processing logic then, at block 506, transmits the data in the buffer to a target device, via an encrypted communication path. The processing logic may, at block 508, determine if all of the data of the file F has been read into the buffer. If not, the processing logic returns to block 504 and continues reading data from the file F into the buffer. Once the entire file F has been read into the buffer, the method ends on the source device.

Simultaneously to the operation of the source device, the processing logic operating on a target device may be receiving, at block 510, data via an encrypted data channel from the source device. The processing logic decrypts, at block 512, the encrypted channel and receives the file-level encrypted data into a local buffer. The processing logic then, at block 514, writes the data of file F to persistent storage without decrypting the file-level encryption. Once a determination is made, at block 516, that all data of file F has been written, the method 500 ends.

Figure 6:
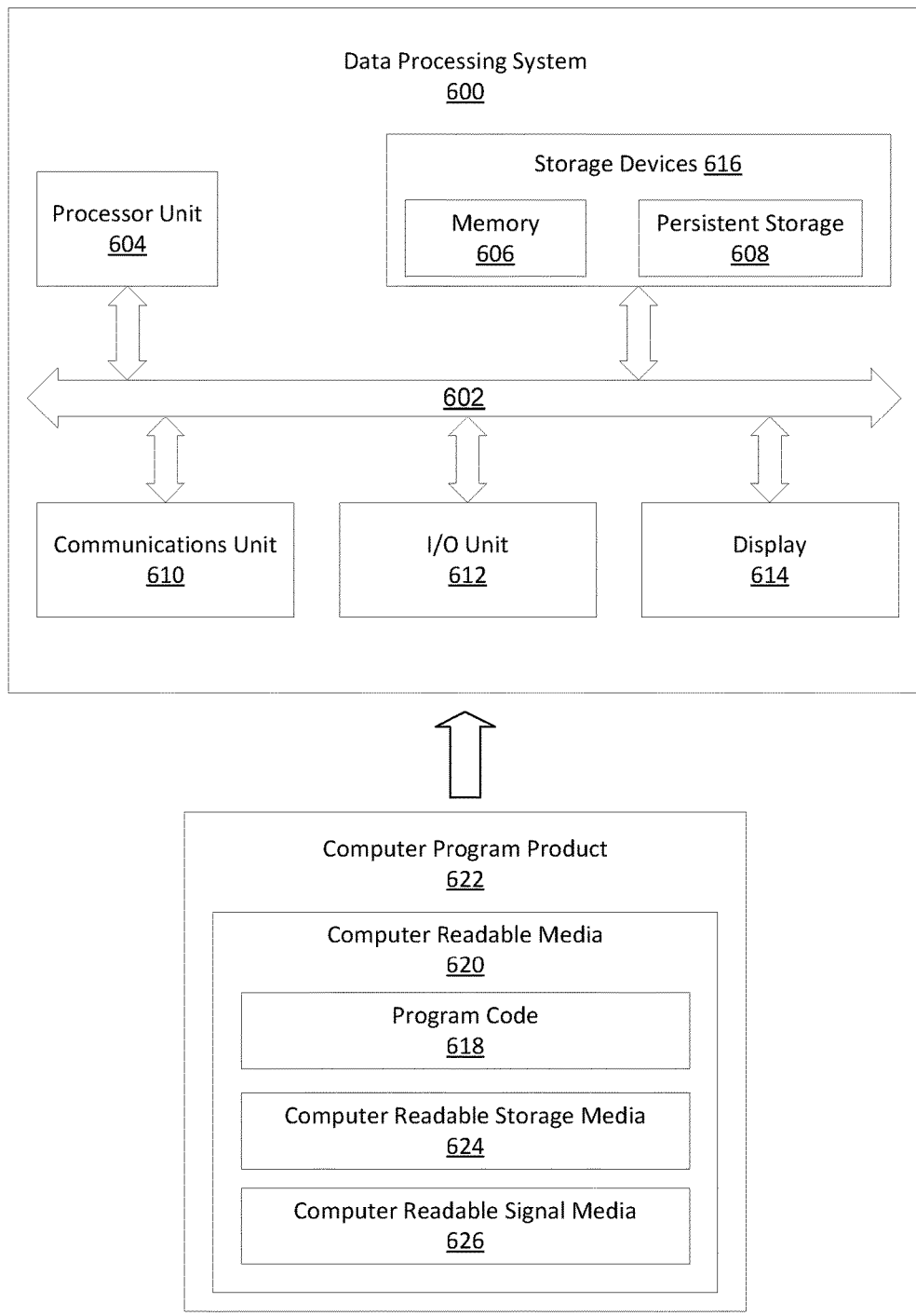
FIG. 6 is a schematic block diagram illustrating one embodiment of an information handling device in accordance with embodiments of the present disclosure.

FIG. 6 is a schematic block diagram illustrating one embodiment of an information handling device in accordance with embodiments of the present disclosure. The information handling system 600 is an example of a computer, which may be used to implement one or more components of embodiments of the invention, and in which computer usable program code or instructions implementing the processes may be located for the illustrative embodiments. In this illustrative example, the information handling system includes communications fabric 602, which provides communications between a processor unit 604, memory 606, persistent storage 608, communications unit 610, input/output (I/O) unit 612, and display 614.

The processor unit 604 serves to execute instructions for software that may be loaded into memory 606. The processor unit 604 may be a set of one or more processors or may be a multi-processor core, depending on the particular implementation. Further, the processor unit 604 may be implemented using one or more heterogeneous processor systems, in which a main processor is present with secondary processors on a single chip. As another illustrative example, the processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Memory 606, in these examples, may be, for example, a random access memory, or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

The communications unit 610, in these examples, provides for communication with other data processing systems or devices. In these examples, the communications unit 610 is a network interface card. The communications unit 610 may provide communications through the use of either or both physical and wireless communications links.

The input/output unit 612 allows for the input and output of data with other devices that may be connected to data processing system 600. For example, the input/output unit 612 may provide a connection for user input through a keyboard, a mouse, and/or some other suitable input device. Further, the input/output unit 612 may send output to a printer. The display 614 provides a mechanism to display information to a user.

Instructions for the operating system, applications, and/or programs may be located in the storage devices 616, which are in communication with the processor unit 604 through the communications fabric 602. In these illustrative examples, the instructions are in a functional form on persistent storage 608. These instructions may be loaded into memory 606 for execution by the processor unit 604. The processes of the different embodiments may be performed by the processor unit 604 using computer implemented instructions, which may be located in a memory, such as the memory 606.

These instructions are referred to as program code, computer usable program code, or computer readable program code that may be read and executed by a processor in the processor unit 604. The program code, in the different embodiments, may be embodied on different physical or computer readable storage media, such as the memory 606 or the persistent storage 608.

Program code 618 is located in a functional form on computer readable media 620 that is selectively removable and may be loaded onto or transferred to the information handling device 600 for execution by the processor unit 604. The program code 618 and computer readable media 620 form computer program product 622. In one example, the computer readable media 620 may be a computer readable storage media 624 or a computer readable signal media 626. The computer readable storage media 624 may include, for example, an optical or magnetic disc that is inserted or placed into a drive or other device that is part of the persistent storage 608 for transfer onto a storage device, such as a hard drive, that is part of the persistent storage 608. The computer readable storage media 624 also may take the form of a persistent storage, such as a hard drive, a thumb drive, or a flash memory that is connected to information handling device 600. In some instances, the computer readable storage media 624 may not be removable from the information handling device 600.

Alternatively, the program code 618 may be transferred to the information handling device 600 using computer readable signal media 526. Computer readable signal media 626 may be, for example, a propagated data signal containing program code 618. For example, the computer readable signal media 626 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, the program code 618 may be downloaded over a network to the persistent storage 608 from another device or data processing system through the computer readable signal media 626 for use within the information handling device 600. For instance, program code stored in a computer readable storage media in a server data processing system may be downloaded over a network from the server to the information handling device 600. The system providing the program code 618 may be a server computer, a client computer, or some other device capable of storing and transmitting program code 618.

The different components illustrated for the information handling device 600 are not meant to provide physical or architectural limitations to the manner in which different embodiments may be implemented. The different illustrative embodiments may be implemented in an information handling device including components in addition to and/or in place of those illustrated for the information handling device 600. Other components shown in FIG. 6 can be varied from the illustrative examples shown. The different embodiments may be implemented using any hardware device or system capable of executing program code. For example, a storage device in the information handling device 600 is any hardware apparatus that may store data. The memory 606, persistent storage 608, and the computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 606 or a cache such as found in an interface and memory controller hub that may be present in the communications fabric 602.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first communication module configured to communicate with, via an insecure network, a second communication module of a target device, where the first communication module is configured to establish a first encrypted communication path to the target device;
   a read module configured to detect that a first file stored on a persistent storage volume is a file-level-encrypted file, and to read the file-level-encrypted file from the persistent storage volume into a first communication buffer that communicates with the target device without decrypting the file-level-encrypted file via the first encrypted communication path;
   a write module configured to detect that a second file that is received via a second communication buffer from a source device is encrypted with file-level encryption, and to write the second file to the persistent storage volume without decrypting the second file; and
   where at least a portion of the read module and the write module comprises one or more of hardware and executable code, the executable code being stored on one or more computer readable storage media.

2. The apparatus of claim 1, where the first communication module is configured to establish a second communication path to receive the second file from the source device.

3. The apparatus of claim 2, where the first communication module is configured to encrypt the second communication path.

4. The apparatus of claim 3, where at least one of the encrypted first communication path or the encrypted second communication path comprises a Secure Shell ("SSH") tunnel.

5. The apparatus of claim 1, where the read module comprises an application programming interface through which a program component requests the first file be retrieved from the persistent storage volume.

6. The apparatus of claim 5, where the write module comprises an application programming interface through which the program component requests that the second file be written to the persistent storage volume.

7. A method for data replication performed on at least one computing device, where the computing device includes a processor and a memory, the method comprising:
   establishing a first encrypted communication path over an insecure network, via a first communication module, with a second communication module of a target device;

detecting that a first file stored on a persistent storage is a file-level-encrypted file, and reading the file-level-encrypted file from the persistent storage volume into the first encrypted communication path without decrypting the file-level-encrypted file;

detecting that a second file that is received via a second encrypted communication path from a source device is encrypted with file-level encryption, and writing the second file to the persistent storage volume without decrypting the second file; and communicating at least one of the first file or the second file, via an insecure network, with at least one of a target device or the source device.

8. The method of claim 7, where at least one of the first encrypted communication path or the second encrypted communication path comprises a Secure Shell ("SSH") tunnel.

9. The method of claim 7, further comprising requesting, via an application programming interface, that the first file be retrieved from the persistent storage volume.

10. The method of claim 7, further comprising requesting, via an application programming interface, that the second file be written to the persistent storage volume.

11. At least one computer storage device storing computer-executable instruction that, when executed by a processor of a computing device that includes a memory, cause the computing device to perform actions comprising:

establishing a first encrypted communication path over an insecure network, via a first communication module, with a second communication module of a target device;

detecting that a first file stored on a persistent storage is a file-level-encrypted file, and reading the file-level-encrypted file from the persistent storage volume into the first encrypted communication path without decrypting the file-level-encrypted file; and detecting that a second file that is received via a second encrypted communication path from a source device is encrypted with file-level encryption, and writing the second file to the persistent storage volume without decrypting the second file.

12. The at least one computer storage device of claim 11, where at least one of the first encrypted communication path or the second encrypted communication path comprises a Secure Shell ("SSH") tunnel.

13. The at least one computer storage device of claim 11, where the actions further comprise requesting, via an application programming interface, that the first file be retrieved from the persistent storage volume.

14. The at least one computer storage device of claim 11, where the actions further comprise requesting, via an application programming interface, that the second file be written to the persistent storage volume.

* * * * *